United States Patent Office 3,337,798
Patented Aug. 22, 1967

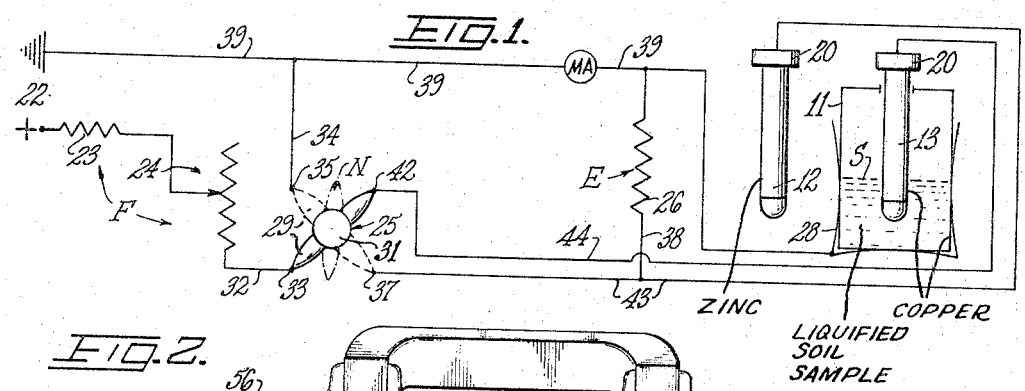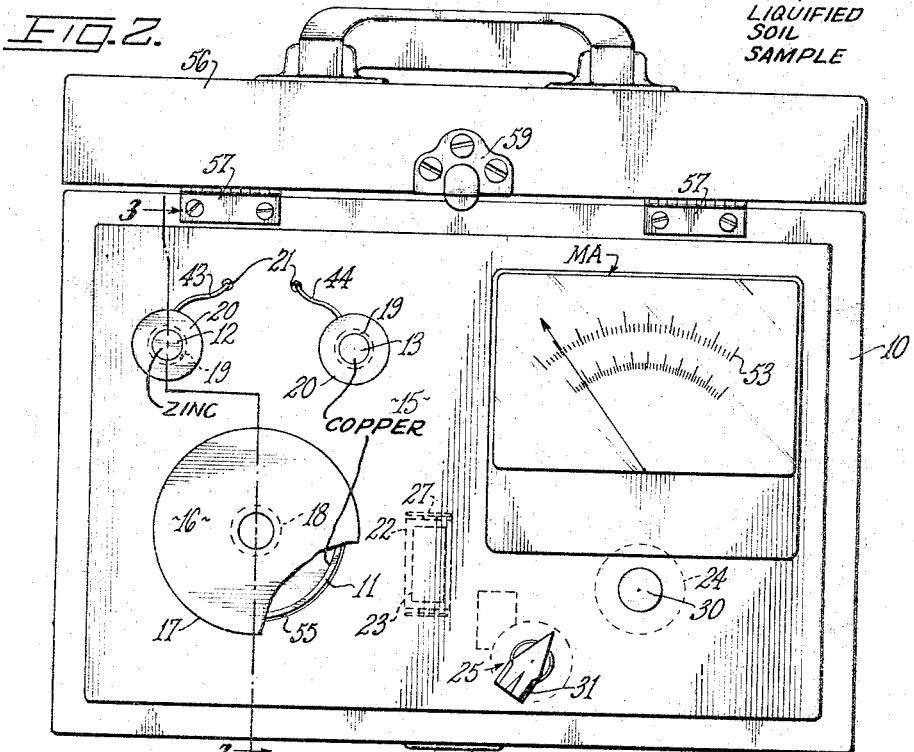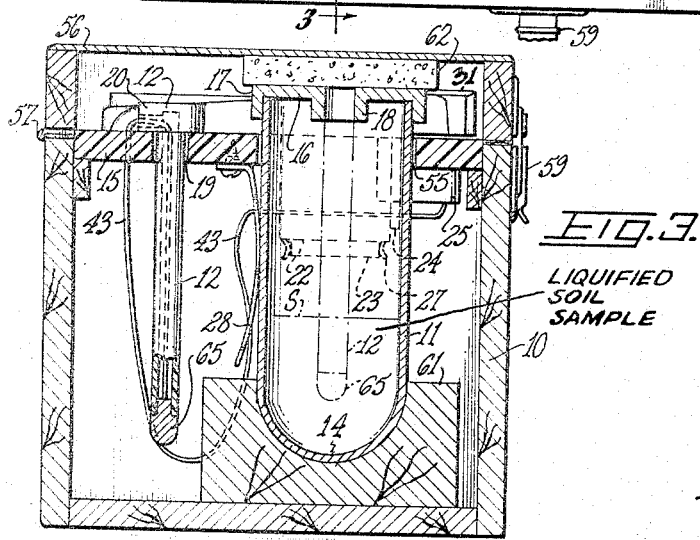

3,337,798
METHOD AND APPARATUS FOR TESTING SOIL CORROSIVITY OR RESISTIVITY
Edward M. Twining, 350 Ocean Ave., Seal Beach, Calif. 90740, and Theodore M. Dunkle, Long Beach, Calif., and Thomas P. Campbell, Box 37, Douglas, Ariz. 85607; said Dunkle assignor to said Twining
Filed Oct. 22, 1965, Ser. No. 534,545
8 Claims. (Cl. 324—65)

This application is a continuation-in-part of our pending application Ser. No. 225,493, filed Sept. 24, 1962, for Method and Apparatus for Soil Testing, now abandoned.

This invention relates to method and apparatus for testing the corrosivity and resistivity of soils, and has as its general object to provide a method for determining these soil characteristics under uniform conditions for each sample tested, wherein the moisture content of the sample need not be considered as a factor in determining the test results. A related object is to provide apparatus which embodies one means with which our method of soil testing may be practiced.

More specifically, the invention provides a method for testing the corrosivity and resistivity of soils which includes the steps of preparing a fluid mixture of the distilled water and the soil to be tested; and then measuring the corrosivity or resistivity electrically through two electrodes contacting the fluid soil mixture in a predetermined, fixed space relationship between the electrodes.

An important aspect of the invention is the utilization of water in a completely neutral, non-conductive state. Hence, distilled water is employed in the process. Another important aspect of the invention is the utilization of a predetermined constant ratio between the quantities of distilled water and of the soil to be tested, so that electrical testing instruments can be preset for taking milliamperage readings in a test circuit across the liquid soil samples, so that successive tests of different amples will each provide a direct reading indicative of corrosivity or resistivity as the case may be.

A further object is to provide a method whereby a simple apparatus can be utilized to provide two alternative circuits, one for measuring resistivity and the other for measuring corrosivity, each in the manner outlined above, and wherein shifting from one circuit to the other can be effected simply by flipping a selector switch.

A further object is to provide a compact, self-contained portable soil testing apparatus with which tests such as those outlined above may be made under field conditions with laboratory precision.

Other objects and advantages will become apparent in the ensuing specification and appended drawing in which:

FIG. 1 is a schematic view of an electrical circuit employed in the apparatus of the present invention;

FIG. 2 is a plan view of a portable soil testing device embodying the instant invention, showing its housing cover in open position to illustrate the mounting of its operating components; and FIG. 3 is a cross-sectional view of the same taken along the line 3—3 of FIG. 2, the cover being shown in closed position.

Our method of testing soil corrosivity or resistivity embodies the following steps. A sample of the soil to be tested is mixed with a neutral aqueous liquid (e.g. distilled water) which in itself is non-conductive. The mixture is of liquid consistency, a preferable proportion being equal parts of soil and water by volume. Conductivity then is directly related to the chemical content of the soil sample. The soil sample is placed in a container. Sufficient distilled water is then added to liquify (saturate or flood) the sample. The container functions as one electrode of a test circuit, and a probe, constituting the other electrode, is inserted into the soil sample while insulated from any direct contact with the container. The probe is positioned in a centered position in the container-equally spaced from all sides thereof, for uniformity of conditions between successive tests. A reading is then taken on a milliammeter in series with the electrodes. In testing for corrosivity, the electrodes are of different metals, the probe being of the same metal as the object upon which the corrosivity of the soil sample is to be determined, and the container is of another metal. The liquified soil sample functions as an electrolyte, and the electrodes and electrolyte act as a voltaic cell to generate the current that is measured on the meter as an indicator of corrosivity. In the resistivity test, the electrodes are of the same metal, a voltage is applied to the circuit, and the reading on the meter is taken as an indication of resistivity (as the reciprocal of conductivity as determined by the activity of the soil sample).

Referring now to the drawing in detail, we have shown as an example of one form of apparatus that can be utilized in practicing the invention, a portable soil testing apparatus comprising, in general, a casing 10, a sample cup 11 for which the casing 10 provides a mounting in a test circuit; alternative electrode units 12 and 13 one of which is insertable in the cup 11 for testing resistivity; a selector switch 25 for switching from the corrosivity circuit to the resistivity circuit and vice versa: a milliammeter MA; electrical components of respective testing circuits E and F; and contact means 28 for contact with the cup 11 when it is positioned in the casing 10, for establishing it as an electrode common to both of the circuits E and F.

Cup 11 is of cylindrical form with the exception of its bottom 14 which is semi-spherical. It is provided with a cover 16 having a rim flange 17 adapted to receive the upper end of the cup and having a central tubular guide collar 18 for positioning a selected one of the electrodes 12, 13 in the cup 11 in accurate co-axial relation thereto so as to provide equal radial spacing between the electrode and all points around the circumference of the barrel. The tips of electrodes 12, 13 are semi-spherical and their length is such that the tip of an electrode depending from the cover 16, as shown in phantom in FIG. 3, is concentric with the bottom 14.

Casing 10 is embodied in a portable case having a main body portion indicated by the numeral 10 and a cover 56 hinged to one side thereof by hinges 57 and secured at the opposite side by separable fastener elements 59. At the top of the casing body 10 is an instrument panel 15 which supports the two electrodes 12, 13 in respective apertures 19 therein, and which receives the cup 11 in an opening 55 with the bottom of the cup positioned in a supporting socket 61 and with its cover 16 yieldingly held by a cushion pad 62 attached to the casing cover 56. Each of the electrodes 12, 13 has a head 20 for supporting the same on the panel 15 or upon the sample cup cover 16 as the case may be. The panel 15 is of insulating material so as to electrically isolate the probe not in use when supported therein.

Instrument panel 15 also supports selector switch 25, which is a rotary switch having an actuator shaft extending upwardly through the panel 15 and having an actuator knob 31 on its upper end. Switch 25 has a movable contact blade 29 and two pairs of fixed contacts 33, 42 and 35, 37; contact blade 29 has a neutral position, indicated at N, and alternate positions closed on contacts 33, 42 or on contacts 35, 37. The panel 15 also supports a potentiometer 24 (part of the resistivity circuit E) secured to the under side of the panel and having a shaft projecting upwardly therethrough and provided with a control knob 30. The panel 15 also supports a power pack 22 and a resistor 23 associated with the potentiometer 24 and the resistivity measuring circuit F; and a resistor 26 forming part of the corrosivity circuit E. The power pack 22 is preferably mounted to the under side of panel 15 and the resistor 23 is detachably coupled to the bottom of power pack 22 by suitable spring contacts 27. Since these electrical components are largely hidden in FIGS. 2 and 3, they are shown largely in phantom in those figures, but with their locations illustrated. Any suitable means for attaching them to the panel can be employed and hence a specific attachment means is not disclosed.

Also carried by the panel 15 and secured to the under side thereof as shown in FIG. 3, is a spring contact brush 28 positioned to be engaged by the side of sample cup 11 when inserted into panel opening 55, and to yieldingly engage the side of the cup so as to establish adequate electrical contact therewith. The electrodes 12 and 13 (which we also refer to as probes) are normally supported directly by the panel 15 in their respective amount apertures 19, and when a test is to be made, after opening the case and preparing a mixture of soil sample and distilled water in the sample cup 11, the latter is restored to its position projecting downwardly through the opening 55 and engaging the contact brush 28, and the appropriate probe 12 to 13 for the test to be made is inserted through the guide collar 18 and into the soil sample.

Resistivity circuit F comprises the power pack 22, providing a current source, resistor 23 and potentiometer 24, a conductor 32, selector switch 25 in the position indicated in full lines, with its movable contact closed on its contacts 33 and 42, a conductor 44, electrode 13, the liquified soil samples, a conductor 39, and the meter MA in series in the conductor 39.

The cup-supporting socket 61 is of insulating material and the case 10 is likewise preferably of non-conductive material.

The cover 16 is of an insulating material such as phenolic-formaldehyde resin or other suitable plastic material. The sample cup 11 is of copper or of an equivalent metal of good conductivity.

Resistivity electrode 13 is of the same material as the cup 11 so as to eliminate any voltaic cell action across the soil sample when this electrode is being used. Resistivity is then measured by applying a voltage to the resistivity circuit F and measuring the current flow in milliamperes on the meter MA.

The electrode 12, on the other hand, is of a metal which is matched to the metal of the soil-embedded body the corrosivity of which is to be determined. For example, if the zinc coating on a galvanized water pipe is to be tested for corrosivity in the soil in which it is embedded, the sample of that soil is tested by using a probe 12 of zinc the corrosivity circuit E, and a sample of the soil surrounding the pipe to be tested.

Corrosivity test circuit E comprises the sample cup 11, functioning as one electrode of a voltaic cell, the contact brush 28 and a conductor 39 connecting the same to the meter MA, conductors 39 and 34 connecting the meter MA to a contact 35 of the selector switch 25, the switch blade 29 connected between the switch contacts 35 and 27 as indicated in dotted lines, a conductor 43 connecting the contact 37 to the electrode 12, and the soil sample in which the lower end of the electrode 12 is immersed. The circuit E also includes the resistor 26 as a shunt across the milliammeter MA, and having a resistance value of approximately 1.80 ohms, to reduce the sensitivity of the meter MA. In this circuit the liquified soil sample functions as an electrolyte between electrodes (the cup 11 and inserted electrode 12) of different metals (e.g. copper and zinc) and corrosivity is measured on a scale 53 registering the same in terms of ounces of corrosion per unit area per year.

Lead portions 43 and 44 of the conductors 43 and 44 respectively are brought out through openings 21 in the panel 15 (FIG. 2) and are detachably connected to the electrodes 12 and 13, respectively. These leads are of sufficient length to permit the removal of the electrodes 12 and 13 from their storage positions on the panel 15 for placement in the sample container 11. Since the electrodes 12 and 13 are detachably connected to their conductors by their leads 43 and 44 they may be changed or interchanged at will. The two circuits are calibrated in the apparatus so as to provide direct readings of varying resistivities and corrosivities in relation to the preselected ratio of soil and water in the liquified soil sample, and since distilled water, free of any impurity which might affect the electrolytic activity of the mixture, is utilized, the difference between readings of various sample mixtures will vary with the difference in electrolytic activity of the soil sample as mixed with the pure water. In the corrosivity test, we have found that the electrolytic activity of the soil, as indicated by the test, is directly related to the corrosive activity of the soil and therefore becomes an accurate indicator of the rate at which the metal of the object under test will corrode under the action of the soil in which it is embedded. It should also be noted that the object of the corrosivity test is to measure the maximum rate at which the embedded metal object will corrode when moisture is present in the embedding soil. Consequently, even though the test is made at a time when the soil is substantially completely dry, the test will provide the desired information as to the rate at which the embedded metal object may be expected to corrode when moisture is added to the soil, as during a rainy season.

While the invention has been described as method and apparatus for soil testing, it is obvious that both may be employed for testing other substances. For example, the corrosivity of tap water may be measured to determine its effect on the metal of the water pipes in which it is carried. Here, if the metals are voltaic, the metal of the pipes may be used as one electrode and the metal from which other parts of the plumbing are made, for example brass fittings, may be used for the other electrode to determine a combined result.

It will be observed, that by using a sample cup of circular cross-section as one electrode and a second rod-like electrode placed in coaxial relationship with the wall of the cup and spaced from its bottom, the surface of the electrodes may have all points of each equidistant apart. Thus, highly accurate results are obtained and uniformity of sample treatment is assured. Since the unit is completely portable, field testing can be conducted at any place with the highest degree of accuracy and uniformity.

In order to provide maximum uniformity of radial spacing between the tip of probes 12, 13 and the inner surface of container 11, the probes are each provided with a metal tip 65 and the body of the probe in each instance is a tube of insulating material (e.g. phenolic resin) in the lower end of which the tip 65 is secured, as by a press fit of a shank of the tip into the tubular body. The conductors 43 and 44 extend downwardly from the heads 20 of the respective probes through the respective tubular bodies of the probes, and are electrically connected to the tips 65. The conductors 43, 44 preferably include separable electric connectors (not shown) at the heads 20, joining them to the portions which extend downwardly through the tubular probe bodies.

Soil sample S is of sufficient volume to fully cover the probe tip 65 of the inserted probe, as indicated in phantom in FIG. 3 and schematically in FIG. 1.

In the claims, the words "pure water" are used, not in the ordinary sense of being free from harmful bacteria, but rather in the sense of being ion-free (of salt or other mineral content that would render the water per se conductive prior to mixing it with a soil sample). Thus, the "pure" water as referred to herein could be distilled water as produced commercially, or could be water condensed in any other manner from water vapor without absorption of mineral, or could be water demineralized by any other known method.

We claim:

1. A method of testing a selected soil for either its corrosivity or resistivity characteristic comprising the following steps: preparing a liquified sample of said soil by mixing it with a pure water in predetermined proportions with sufficient water to liquify the sample; enclosing said liquified sample in a metallic container functioning as one electrode of a conductive cell; determining resistivity by inserting a second electrode of said cell in the form of a probe of the same metal as said sample cup into said liquified soil sample while insulating it from direct contact with said container, positioning said probe with its surface in a predetermined fixed spaced relationship to the internal surface of said container, connecting said cell to a milliammeter for measurement of the current flowing through said cell, utilizing said milliammeter and cell in an electric circuit precalibrated to provide a desired indicator relationship between said readings of said liquified sample, said milliammeter, and the resistivity and corrosivity values to be determined, applying a voltage across said cell and said milliammeter, and taking a reading on said milliammeter to determine said current as a measure of resistivity; and when corrosivity is to be determined, switching said voltage source out of circuit, substituting a probe electrode of a different metal than said sample container, such as to constitute said container and the probe electrode therein a voltaic cell with said liquified sample functioning as an electrolyte thereof, and taking a reading of the voltaic current generated by said voltaic cell, as an indication of corrosivity of said soil when in contact with a metal the same as that of said probe electrode.

2. A method of determining corrosivity of a soil upon a metal body embedded therein, comprising the following steps: preparing a liquified sample of the soil in distilled water by mixing the sample with at least an equal volume of said water; enclosing the liquified soil sample in a container of metal different from that of said embedded body, arranged to function as one electrode of a voltaic cell; inserting into said container and into the soil sample therein, a probe of the same metal as said embedded body; to function as a second electrode of said cell, positioning said probe with its surfaces in a predetermined fixed spaced relationship to the surfaces of said container; utilizing said voltaic cell in an electric circuit including an electric current meter and precalibrated to provide a desired indicator relationship between a reading of said meter, said liquified sample, and the corrosivity characteristic to be determined, and measuring the current generated by said voltaic cell to determine the corrosivity of said soil sample upon said embedded body.

3. The method defined in claim 2, wherein equal parts of soil and distilled water are used in said liquified soil sample.

4. A method for determining the resistivity of soil comprising the steps of enclosing a soil sample in a metal container which constitutes a first electrode of a conductivity cell, adding to said soil sample pure water in sufficient volume as related to that of said soil sample to liquify the sample extending a second electrode, of a metal the same as that of said container, into said container and into said liquified soil sample, with its surface in a predetermined fixed spaced relationship with the surface of said container; utilizing said cell in a circuit including an electric current meter and calibrated to provide a desired indicator relationship between a reading of said meter, said sample, and the resistivity characteristic to be determined, impressing a difference of potential in said circuit upon said first and second electrodes and measuring the resulting current in said circuit to determine the resistivity of said soil sample.

5. The method defined in claim 4, wherein said liquified soil sample comprises equal parts of soil and water by volume.

6. In an apparatus for determining the corrosive and resistive properties of a substance, in combination: first and second probe-type metal electrodes; a container for receiving a sample of said substance, liquified by admixture with pure water, said container including a sample cup constituting a third electrode and including a cover having means defining an insulative opening therein for selectively receiving either said first or said second electrode for injection into said substance and to position each in a predetermined fixed spaced relationship with said third electrode, said sample cup being of a metal the same as that of said first electrode and different from that of said second electrode; means providing connections to an electric voltage source; an electric current meter; means, including an electric switch, for establishing a resistivity-indicating circuit between said voltage source, said meter, said sample cup and said first electrode when the latter is inserted into a liquified sample of said substance contained in said cup, whereby the flow of electric current produced by said voltage source may be read on said meter as an indication of resistivity of said sample; and means including said switch, for establishing an electric circuit between said sample cup and said second electrode, shunting out said voltage source, when said second electrode is inserted into a liquified sample of said substance contained in said cup where said substance, when mixed with pure water, is such as to constitute said liquified sample an electrolyte of a voltaic cell including said sample cup and second electrode, whereby a flow of electric current, generated by said cell, may be read as an indication of the corrosivity of said substance upon a metal of the same kind as said second electrode, in contact with said substance.

7. In an apparatus for determining the corrosive and resistive properties of a substance the combination claimed in claim 6 including a shunt resistor conditioned to be connected in parallel with said current measuring device in said corrosivity indicating circuit, said switch being arranged for so connecting said shunt resistor.

8. In an apparatus for determining the corrosive and resistive properties of a substance the combination claimed in claim 6 including a shunt resistor conditioned to be connected in parallel with said current measuring device in said corrosivity indicating circuit, said switch being arranged for so connecting said shunt resistor and for switching said current measuring device out of circuit.

References Cited

UNITED STATES PATENTS

| 2,583,284 | 1/1952 | Wyllie et al. | 324—13 X |
| 2,636,962 | 5/1953 | Bouyoucos | 324—65 X |
| 2,755,438 | 7/1956 | Cudmore | 324—65 |
| 3,019,384 | 1/1962 | Wayne | 324—29 |
| 3,217,250 | 11/1965 | Goemann | 324—30 X |

WALTER L. CARLSON, *Primary Examiner.*

C. F. ROBERTS, *Assistant Examiner.*